United States Patent
Kato et al.

(10) Patent No.: US 6,569,552 B2
(45) Date of Patent: May 27, 2003

(54) FUEL CELL SYSTEM INCLUDING FUEL CELL FOR GENERATING ELECTRIC ENERGY BY CHEMICAL REACTION BETWEEN HYDROGEN AND OXYGEN

(75) Inventors: Haruhiko Kato, Anjo (JP); Naoto Hotta, Aichi-gun (JP); Kunio Okamoto, Okazaki (JP); Tadayoshi Terao, Toyoake (JP); Kiyoshi Kawaguchi, Toyota (JP); Masanori Uehara, Kariya (JP)

(73) Assignee: Denso Corporation, Kariya (JP)

( * ) Notice: Subject to any disclaimer, the term of this patent is extended or adjusted under 35 U.S.C. 154(b) by 154 days.

(21) Appl. No.: 09/783,036

(22) Filed: Feb. 15, 2001

(65) Prior Publication Data

US 2001/0018142 A1 Aug. 30, 2001

(30) Foreign Application Priority Data

Feb. 17, 2000 (JP) ........................ 2000-045135
Jun. 16, 2000 (JP) ........................ 2000-181665

(51) Int. Cl.$^7$ .................... H01M 8/18; H01M 8/12; H01M 8/06; H01M 8/07
(52) U.S. Cl. ...................... 429/17; 429/22; 429/25
(58) Field of Search .................... 429/19, 13, 17, 429/22, 25

(56) References Cited

U.S. PATENT DOCUMENTS 4,963,443 A 10/1990 Kamoshita
6,096,448 A * 8/2000 Wilkinson et al. ............ 429/13

FOREIGN PATENT DOCUMENTS

| JP | 57009071 A1 * | 1/1982 | .................. 429/20 |
| JP | 60-207255 | 10/1985 | |
| JP | 3-108269 | 5/1991 | |
| JP | 03266367 A * | 11/1991 | .......... H01M/08/06 |

* cited by examiner

Primary Examiner—Patrick Ryan
Assistant Examiner—Gregg Cantelmo
(74) Attorney, Agent, or Firm—Harness, Dickey & Pierce, P.L.C.

(57) ABSTRACT

A fuel cell system includes a fuel cell (FC stack), an inflow passage valve provided in a hydrogen inflow passage through which hydrogen is supplied to the FC stack, and a discharge passage valve provided in a hydrogen discharge passage through which hydrogen containing gas is discharged from the FC stack as exhaust gas. In the fuel cell, hydrogen is supplied to the FC stack intermittently in accordance with an amount of hydrogen consumed in the FC stack, by controlling opening and closing of the inflow passage valve and the hydrogen discharge valve.

7 Claims, 14 Drawing Sheets

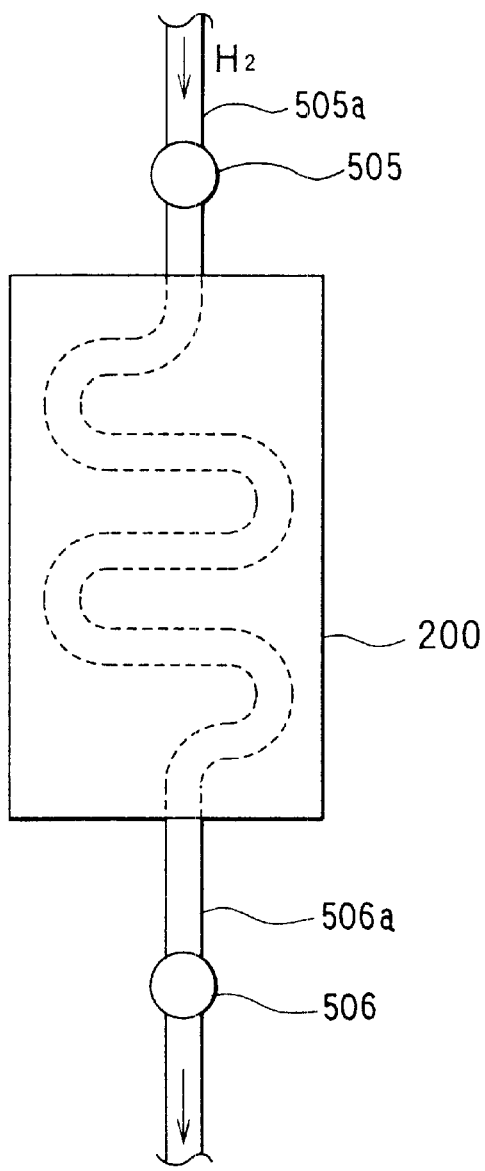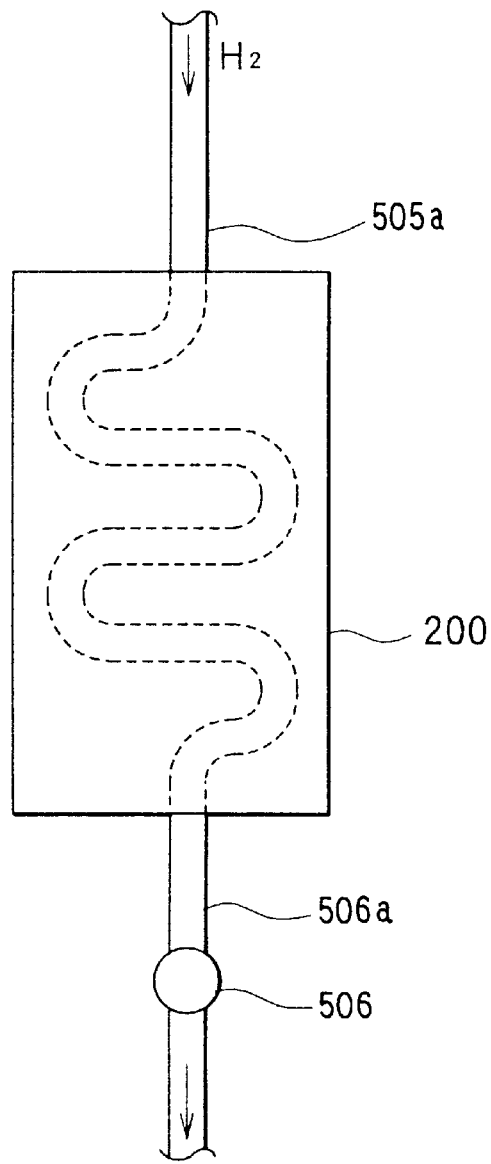

FUEL CELL SYSTEM INCLUDING FUEL CELL FOR GENERATING ELECTRIC ENERGY BY CHEMICAL REACTION BETWEEN HYDROGEN AND OXYGEN

CROSS REFERENCE TO RELATED APPLICATIONS

This application is based upon and claims the benefit of Japanese Patent Applications No. 2000-45135 filed on Feb. 17, 2000, and No. 2000-181665 filed on Jun. 16, 2000, the contents of which are incorporated herein by reference.

BACKGROUND OF THE INVENTION

1. Field of the Invention

This invention relates to a fuel cell system including a fuel cell that generates electric energy by a chemical reaction between hydrogen and oxygen, which is effectively applicable to a movable body such as vehicles, ships, and portable generators.

2. Description of the Related Art

A fuel cell generates an electric power by a chemical reaction between hydrogen and oxygen that are supplied in accordance with a required electric power. However, it is difficult to utilize hydrogen supplied to the fuel cell at 100%, and non-reacted hydrogen is discharged together with exhaust gas (water vapor, carbon dioxide, and the like). Generally, an amount of hydrogen supplied to the fuel cell is set at a value larger than a theoretical value in consideration of the amount of non-reacted hydrogen. Because of this, it is difficult to decrease the amount of non-reacted hydrogen discharged from the fuel cell.

SUMMARY OF THE INVENTION

The present invention has been made in view of the above problem. An object of the present invention is to decrease an amount of non-reacted hydrogen that is discharged from a fuel cell.

According to the present invention, briefly, hydrogen is supplied to a fuel cell intermittently in accordance with an amount of hydrogen consumed in the fuel cell.

Preferably, a discharge passage valve (second valve) is provided in a hydrogen discharge passage through which hydrogen containing gas is discharged from the fuel cell as exhaust gas. The discharge passage valve opens or closes the hydrogen discharge passage based on the amount of hydrogen consumed in the fuel cell.

More preferably, an inflow passage valve (first valve) is provided in a hydrogen inflow passage, and opens or closes the hydrogen inflow passage. The hydrogen inflow valve is opened to supply hydrogen to the fuel cell when the hydrogen concentration in the fuel cell is equal to or less than a first concentration. The discharge passage valve is closed to stop supplying the hydrogen to the fuel cell when the hydrogen concentration detected in the fuel cell is equal to or larger than a second concentration larger than the first concentration.

Accordingly, when the hydrogen concentration in the fuel cell is high, hydrogen stays in the fuel cell to be sufficiently reacted, and when the hydrogen concentration in the fuel cell is low, hydrogen is further supplied to the fuel cell. Consequently, an amount of non-reacted hydrogen discharged from the fuel cell can be reduced.

BRIEF DESCRIPTION OF THE DRAWINGS

Other objects and features of the present invention will become more readily apparent from a better understanding of the preferred embodiments described below with reference to the following drawings, in which;

FIG. 7 is an enlarged view showing the FC stack and the vicinity thereof in the first embodiment;

FIG. 9 is an enlarged view showing an FC stack and the vicinity thereof in the fourth embodiment;

DETAILED DESCRIPTION OF THE PREFERRED EMBODIMENTS (First Embodiment)

Figure 1:
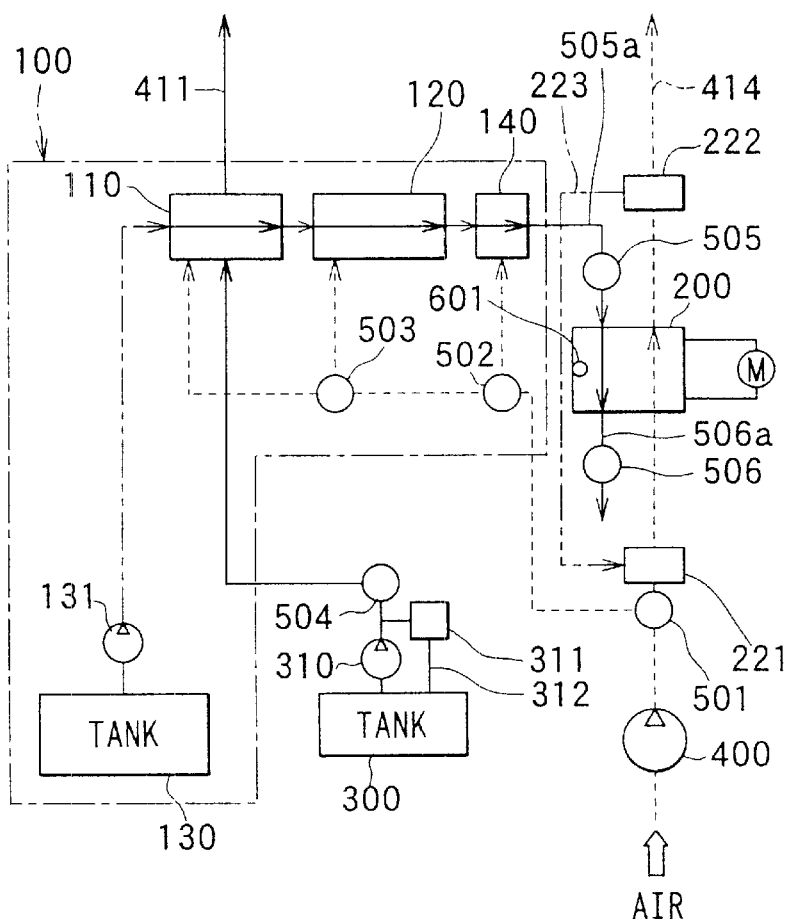
FIG. 1 is a schematic diagram showing a fuel cell system in a first preferred embodiment.

In a first preferred embodiment, a fuel cell system according to the invention is applied to an electric vehicle (hereinafter, abbreviated as vehicle), which is schematically shown in FIG. 1.

As shown in FIG. 1, the fuel cell system includes a hydrogen generator (hydrogen supply unit) 100 (surrounded by a dashed line) and a fuel cell (FC stack) 200. The hydrogen generator 100 generates hydrogen rich gas containing a large amount of hydrogen, from a mixing solution of water and methanol (methanol mixing solution), and supplies the hydrogen rich gas to the FC stack 200 explained below.

The hydrogen generator 100 is composed of a fuel evaporator 110 for evaporating the methanol mixing solution, a fuel reforming unit (reformer) 120 for inducing a chemical reaction between methanol vapor and water vapor evaporated (gasified) in the evaporator 110 to reform into hydrogen, carbon dioxide, and a small amount of carbon monoxide, and the like, thereby forming hydrogen. Methanol mixing solution is transferred from a tank 130, which is mounted on a vehicle and stores methanol mixing solution, to the evaporator 110 by a first pump 131.

In the FC stack 200, a chemical reaction between hydrogen rich gas produced in the hydrogen generator 100 and air (oxygen) occurs to generate electricity. The electricity generated in the FC stack 200 drives a motor M. The fuel cell stack 200 contains electrode catalyst whose catalytic function is liable to be lessened by carbon monoxide. Because of this, in this embodiment, a carbon monoxide reducing unit 140 is provided in the hydrogen generator 100, which oxidizes carbon monoxide produced in the reformer 120 to transform it into carbon dioxide.

Air that is to be blown to the FC stack 200 is humidified by an air humidifier 221, and a dehumidifier 222 cools exhaust gas (water vapor, air, and the like) discharged from the FC stack 200, and collectively removes water from the exhaust gas. Water collected by the dehumidifier 222 is returned to the air humidifier 221 via a condensed water return passage 223, and is reused to humidify air blown to the FC stack 200.

Figure 2:
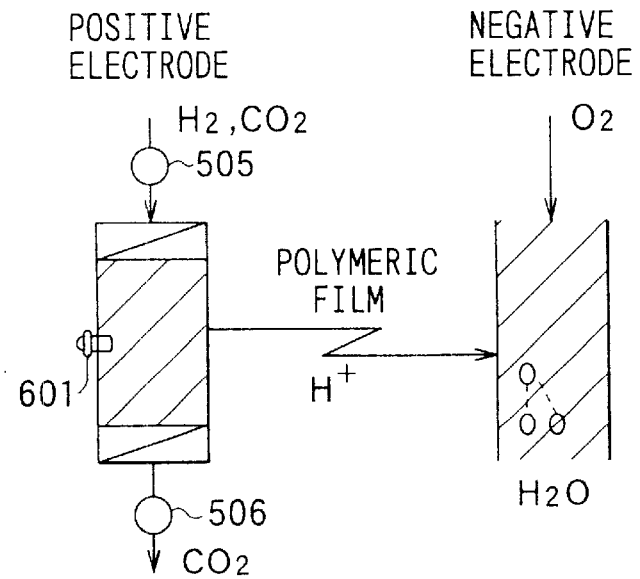
FIG. 2 is a schematic view showing a fuel cell (FC stack) in the first embodiment.

In the FC stack 200, as shown in FIG. 2, a positive electrode side and a negative electrode side are separated from each other with a polymeric film interposed therebetween. Air (oxygen) is supplied to the positive electrode side, while hydrogen rich gas is supplied to the negative electrode side. Therefore, exhaust gas containing water vapor at a large content is discharged from the positive electrode side, and non-reacted hydrogen gas and carbon dioxide are discharged from the negative electrode side.

Referring back to FIG. 1, a methanol fuel tank 300 is provided to store fuel (methanol in this embodiment) for heating the evaporator 110, which is mounted on the vehicle. Methanol (fuel) stored in the methanol fuel tank 300 is transferred to the evaporator 110 by a second pump 310. Incidentally, a fuel return valve 311 is provided to open or close a methanol return passage 312 that returns a part of methanol discharged from the second pump 310 to the methanol fuel tank 300. A methanol valve 504 controls a supply amount of methanol supplied from the methanol fuel tank 300 to the evaporator 110 and the reformer 120.

Hydrogen rich gas is supplied from the hydrogen generator 100 to the FC stack (negative electrode side) 200 via a hydrogen inflow passage 505a, and a first hydrogen valve (an inflow passage valve) 505 is provided to open or close the hydrogen inflow passage 505a. FIG. 7 schematically shows the FC stack 200 and the vicinity thereof. The supplied hydrogen rich gas flows in the FC stack 200 and is consumed therein by reacting with oxygen to generate electricity, and residual gas is expelled from a discharge port (hydrogen discharge passage) 506a provided at the negative electrode side of the FC stack 200. A second hydrogen valve (discharge passage valve) 506 is provided to open or close the discharge port 506a.

On the other hand, outside air is sucked by an air pump 400 and is supplied to the hydrogen generator 100 (evaporator 110 and the reformer 120) and to the FC stack 200. A first air distribution valve 501 distributes air supplied from the air pump 400 into the hydrogen generator 100 and the FC stack 200 while controlling the respective distribution amounts. Second and third air distribution valves 502, 503 further distribute air, which is distributed to the side of the hydrogen generator 100 by the first air distributor 501, into the evaporator 110, the reformer 120, and the carbon monoxide reducing unit 140 while controlling the respective distribution amounts.

Burned exhaust gas generated in the hydrogen generator 100 and exhaust gas generated in the FC stack 200 are emitted into the atmosphere via exhaust passages 411 and 414. Further, in this embodiment, exhaust gas from the discharge port 506a at the negative electrode side of the FC stack 200 is also emitted to the atmosphere as well.

Figure 3:
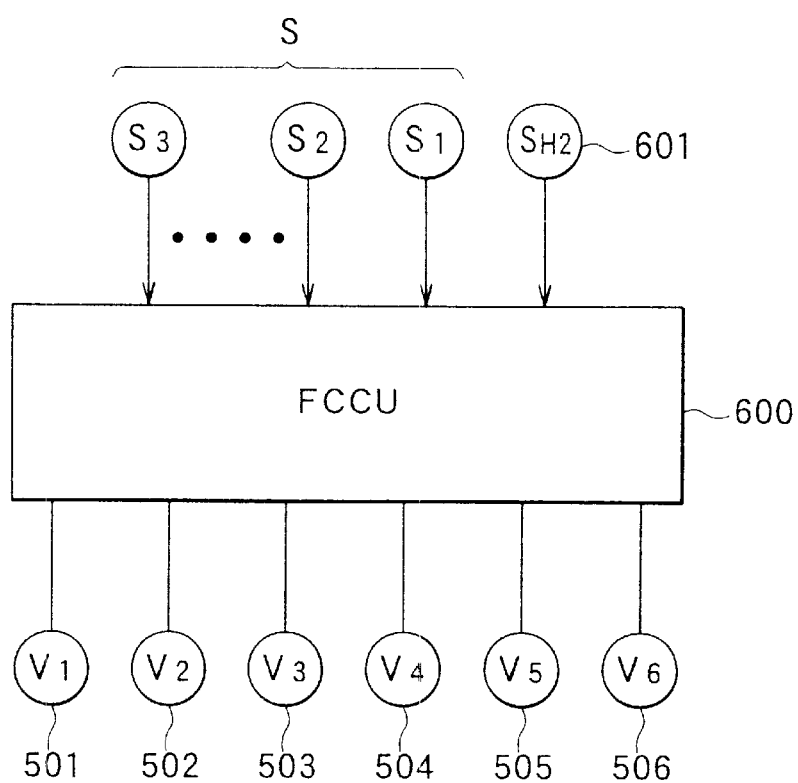
FIG. 3 is a control block diagram of the fuel cell system in the first embodiment.

FIG. 3 shows a control block diagram of the fuel cell system. As shown in FIGS. 1 to 3, the FC stack 200 has a hydrogen sensor 601 for detecting a concentration of hydrogen (hydrogen amount) existing in the FC stack 200 (negative electrode side), and a detected signal of the hydrogen sensor 601 is inputted to an FC system control unit (FCCU) 600 that controls the entirety of the fuel cell system. The first to third air distribution valves 501 to 503, the methanol valve 504, the first and second hydrogen valves 505, 506 are controlled by the FCCU 600 based on the detected signal of the hydrogen sensor 601, the temperature of the FC stack 200, and detected signals of a sensor group S that detects operational states such as a load of the motor.

Next, operations of the first and second hydrogen valves 505, 506, which are the features of the present embodiment, are explained below.

Figure 4:
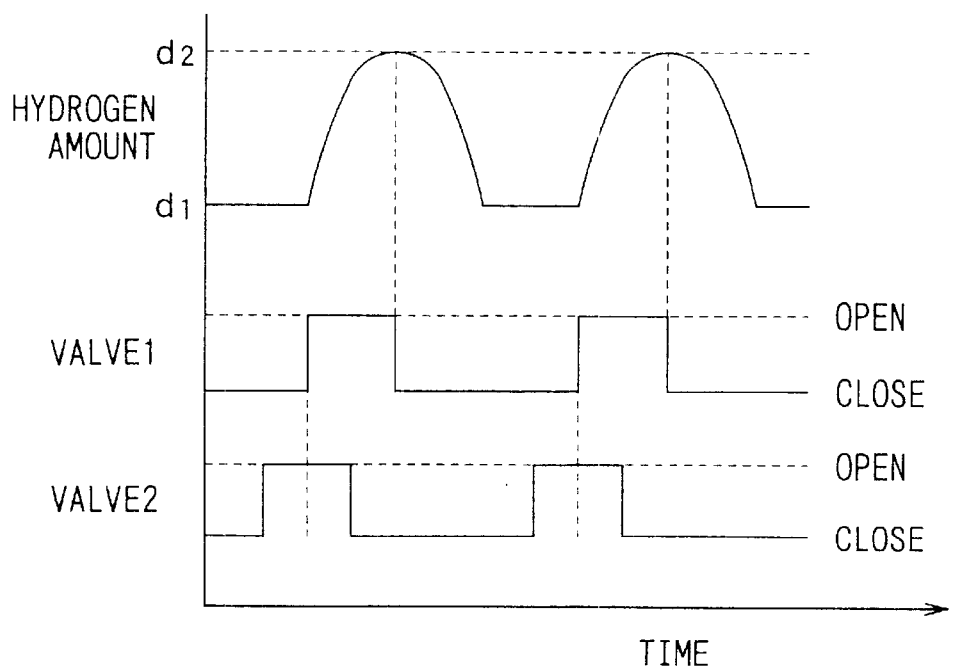
FIG. 4 is a graph showing timings for opening and closing first and second hydrogen valves with respect to a hydrogen amount (residual hydrogen concentration in the FC stack) detected by a hydrogen sensor.

FIG. 4 shows timing for opening and closing the first and second hydrogen valves 505, 506 with respect to the hydrogen amount (residual hydrogen concentration in the FC stack) detected by the hydrogen sensor 601. As shown in FIG. 4, when the residual hydrogen concentration in the FC stack 200 is equal to or smaller than a first predetermined concentration d1, the first hydrogen valve 505 (valve 1) is opened to supply hydrogen into the FC stack 200. When the residual hydrogen concentration is equal to or larger than a second predetermined concentration d2 that is larger than the first predetermined concentration, the first hydrogen valve 505 is closed to stop supplying hydrogen into the FC stack 200. On the other hand, the second hydrogen valve 506 (valve 2) is opened before the timing when the first hydrogen valve 505 is opened, and is closed before the timing when the first hydrogen valve 505 is closed.

Thus, according to this embodiment, because the first hydrogen valve 505 is opened when the residual hydrogen concentration is equal to or smaller than the first predetermined concentration d1 and the first hydrogen valve 505 is closed when the residual hydrogen concentration is equal to or smaller than the second predetermined concentration d2, hydrogen is supplied to the FC stack 200 intermittently in accordance with the consumption of hydrogen in the FC stack 200. Therefore, the generation of non-reacted hydrogen gas is suppressed to prevent the non-reacted hydrogen gas from being discharged from the FC stack 200.

Meanwhile, the hydrogen rich gas supplied to the negative electrode side (FC stack 200) contains gases other than hydrogen, such as carbon dioxide. If these gases other than hydrogen remain at the negative electrode side (FC stack 200), hydrogen is difficult to be further supplied into the FC stack 200, and the power generation capability of the FC stack 200 deteriorates.

However, in this embodiment, the second hydrogen valve 506 is opened before the first hydrogen valve 505 is opened, and is closed before the first hydrogen valve 505 is closed. Therefore, there arises a period of time in which both the first and second hydrogen valves 505, 506 are opened, and the residual gases such as carbon dioxide can be promptly expelled by further supplied hydrogen rich gas. In consequence, the power generation capability of the FC stack 200 can be prevented from being lessened.

In this embodiment, the timings for opening and closing the second hydrogen valve 506 are different from those for the first hydrogen valve 505; however, the timings for opening and closing the two valves 505, 506 may be simultaneous with each other.

(Second Embodiment)

In the first embodiment, the hydrogen sensor 601 detects the residual hydrogen concentration (residual hydrogen amount) in the FC stack 200 directly; however, the hydrogen concentration may be detected indirectly based on a physical quantity related to the hydrogen concentration.

Figure 5:
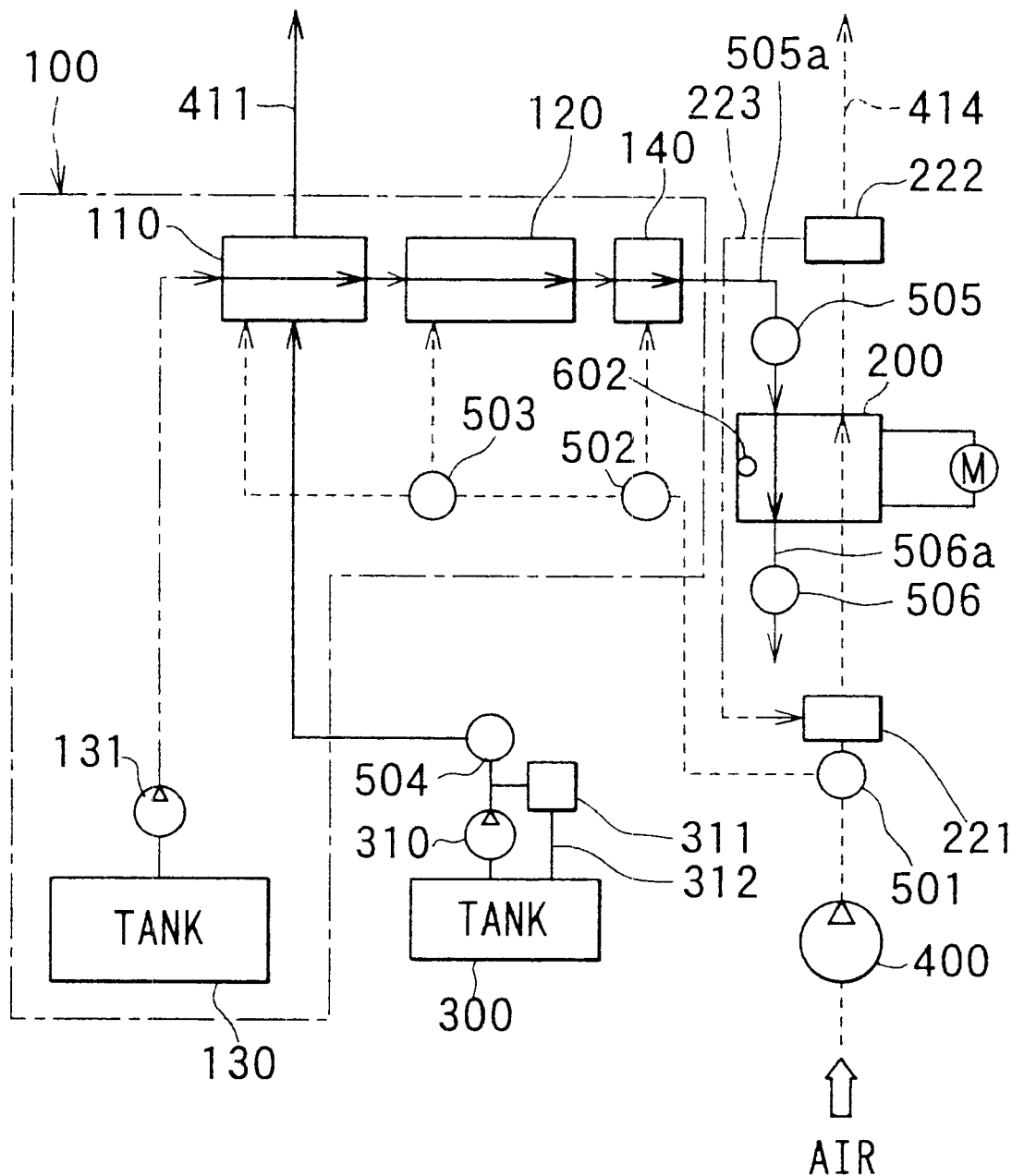
FIG. 5 is a schematic diagram showing a fuel cell system in a second preferred embodiment.
Figure 6:
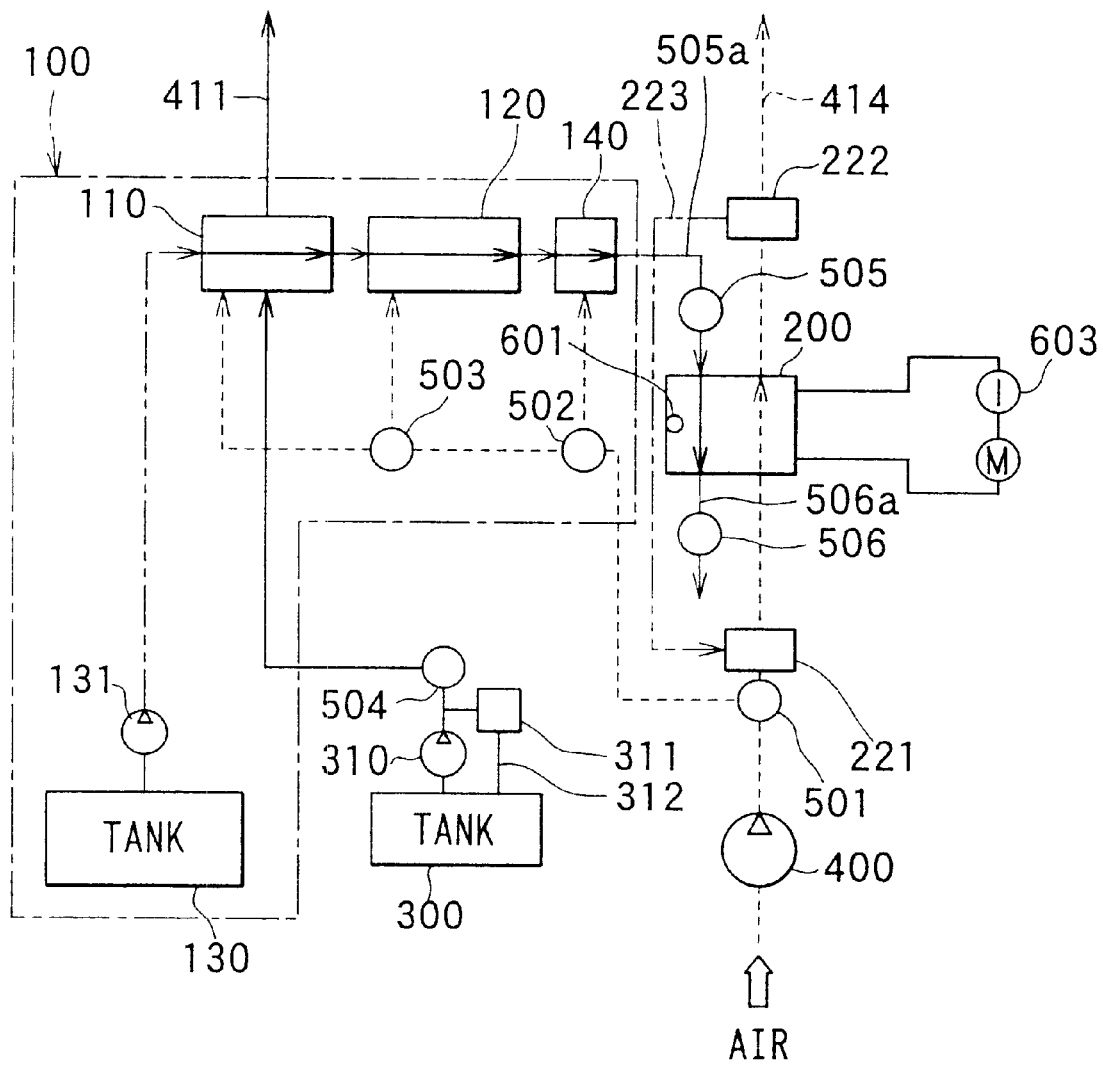
FIG. 6 is a schematic diagram showing a fuel cell system in a third preferred embodiment.

For example, in a second preferred embodiment, as shown in FIG. 5, a pressure senor (pressure detecting unit) 602 is provided in place of the hydrogen sensor 601 to detect a pressure of gas in the FC stack 200 (negative electrode side). Accordingly, the residual hydrogen concentration in the FC stack 200 can be detected indirectly.

(Third Embodiment)

In the first embodiment, the hydrogen sensor 601 detects the residual hydrogen concentration in the FC stack 200 directly. In a third preferred embodiment, a current detector 603 is provided in place of the hydrogen sensor 601 to detect an electric energy (current amount). Accordingly, the residual hydrogen concentration in the FC stack 200 can be detected indirectly because the hydrogen amount consumed in the FC stack 200 is proportional to the current amount outputted from the FC stack 200.

Otherwise, because the hydrogen amount consumed in the FC stack 200 is related to an elapsed time from the time when hydrogen is supplied into the FC stack 200, a timer may be used as a residual hydrogen concentration detecting unit, to which a specific time period is previously set based on a hydrogen consumed amount in the FC stack 200.

(Fourth Embodiment)

Figure 8:
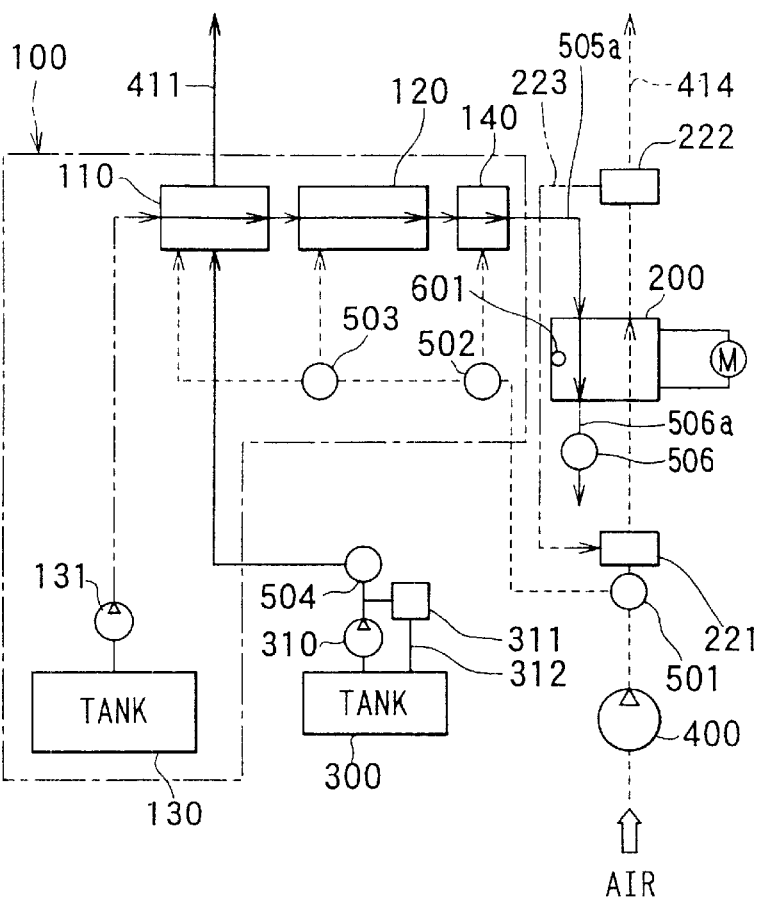
FIG. 8 is a schematic diagram showing a fuel cell system in a fourth preferred embodiment.

Referring to FIG. 8, in a fourth preferred embodiment, as in the first embodiment, hydrogen rich gas is supplied from the hydrogen generator 100 into the FC stack 200 (negative electrode side) via the hydrogen inflow passage 505a, and is discharged from the FC stack 200 via the discharge passage 506a.

In the fuel cell system of this embodiment, as shown in FIGS. 8 and 9, the first hydrogen valve 505 is not provided, and only the second hydrogen valve (discharge passage valve) 506 is provided to open or close the hydrogen discharge passage 506a. The discharge passage valve 506 controls the supply of hydrogen rich gas into the FC stack 200 and the discharge of residual gas by opening or closing the discharge passage 506a. The other features are substantially the same as those in the first embodiment, and the same parts as those in the first embodiment are denoted with the same reference numerals.

Figure 10:
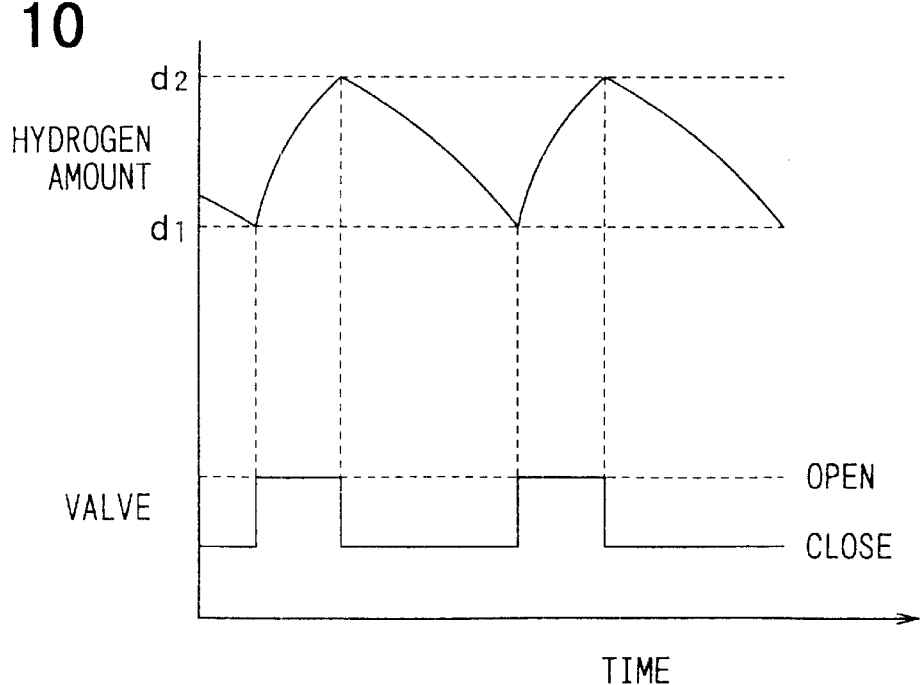
FIG. 10 is a graph showing timings for opening and closing a discharge passage valve with respect to a hydrogen amount (residual hydrogen concentration in the FC stack) detected by a hydrogen sensor.

Next, the operation of the discharge passage valve 506 is explained below with reference to FIG. 10. FIG. 10 is a graph showing a relation between the hydrogen amount (residual hydrogen concentration in the FC stack) detected by the hydrogen sensor 601 and timings for opening and closing the discharge passage valve 506.

As shown in FIG. 10, when the residual hydrogen concentration in the FC stack 200 is equal to or less than a first predetermined concentration d1, the discharge passage valve 506 is opened so that hydrogen is supplied to the FC stack 200. Accordingly, hydrogen rich gas is supplied from the hydrogen generator 100 into the FC stack 200 via the hydrogen inflow passage 505a, and the hydrogen concentration in the FC stack 200 increases.

When the hydrogen concentration in the FC stack 200 is equal to or larger than a second predetermined concentration d2 that is larger than the first predetermined concentration d1, the discharge passage valve 506 is closed to stop the supply of hydrogen to the FC stack 200. In the FC stack 200, hydrogen and oxygen chemically react to generate electricity, so that the hydrogen concentration is decreased by the consumption of hydrogen. The amount of electric power generated by the FC stack 200 is gradually decreased in accordance with the decrease in the hydrogen concentration.

Then, when the hydrogen concentration in the FC stack 200 is equal to or less than the first predetermined concentration d1, the hydrogen valve 506 is opened to supply hydrogen rich gas from the hydrogen generator 100 into the FC stack 200, and to expel the residual gas having a decreased hydrogen concentration, from the FC stack 200. After that, as shown in FIG. 10, the opening and closing of the valve 506 are repeated in accordance with the consumption of hydrogen in the FC stack 200 so that hydrogen is supplied to the FC stack 200 intermittently.

Thus, in the fuel cell system of the fourth embodiment, the discharge passage valve 506 is provided to open or close the discharge passage (discharge port) 506a of the FC stack 200 in accordance with the consumed amount of hydrogen in the FC stack 200. Accordingly, hydrogen rich gas can be supplied to the FC stack 200 intermittently. That is, when the hydrogen concentration in the FC stack 200 is high, the hydrogen valve 506 is closed so that hydrogen is left in the FC stack 200 to be sufficiently reacted. When the hydrogen concentration in the FC stack 200 is low, the hydrogen valve 506 is opened so that residual gas having the decreased hydrogen concentration is discharged from the FC stack 200 and hydrogen rich gas is further supplied into the FC stack 200. Accordingly, the amount of non-reacted hydrogen discharged from the FC stack 200 can be reduced.

In the fourth embodiment, since only one valve is provided in the hydrogen discharge passage 506a at the downstream side of the FC stack 200, the FCCU 600 can control the valve 506 easily, and low cost is realized.

(Fifth Embodiment)

A fifth preferred embodiment of the invention is explained with reference to FIGS. 11 and 12. In this embodiment, a hydrogen circulation passage 700 is provided to circulate hydrogen in the FC stack 200. This point is different from the first embodiment. The other features are substantially the same as those in the first embodiment, and the same parts are designated with the same reference numerals as in the first embodiment.

Specifically, as explained as above, power generation is accompanied by consumption of hydrogen, so that the hydrogen concentration in the FC stack 200 is decreased. The decrease of the hydrogen concentration in the FC stack 200 lessens the power generation capability of the FC stack 200. It is considered that the decrease of the hydrogen concentration in the FC stack 200 occurs as follows.

First, hydrogen existing at the negative electrode side in the FC stack 200 diffuses in and passes through the film to move to the positive electrode side. Further, hydrogen existing in the vicinity of the surface of the electrode (negative electrode) becomes hydrogen ions in contact with the electrode, and hydrogen ions are attracted due to a coulomb force with oxygen ions existing at the positive electrode side to pass through the polymeric film, and to move to the positive electrode side. Consequently, the hydrogen concentration is decreased at the negative electrode side in the FC stack 200. At that time, the hydrogen concentration is not decreased uniformly at the negative electrode side, but is significantly decreased in the vicinity of the electrode and in the vicinity of the polymeric film.

In the above-described embodiments, the discharge passage valve 506 is closed to keep hydrogen rich gas remaining in the FC stack 200 so that the non-reacted hydrogen amount discharged from the FC stack 200 is reduced. Because of this, in the FC stack 200, residual gas including hydrogen in a decreased concentration is not stirred and the uneven hydrogen concentration state is kept.

Figure 11:
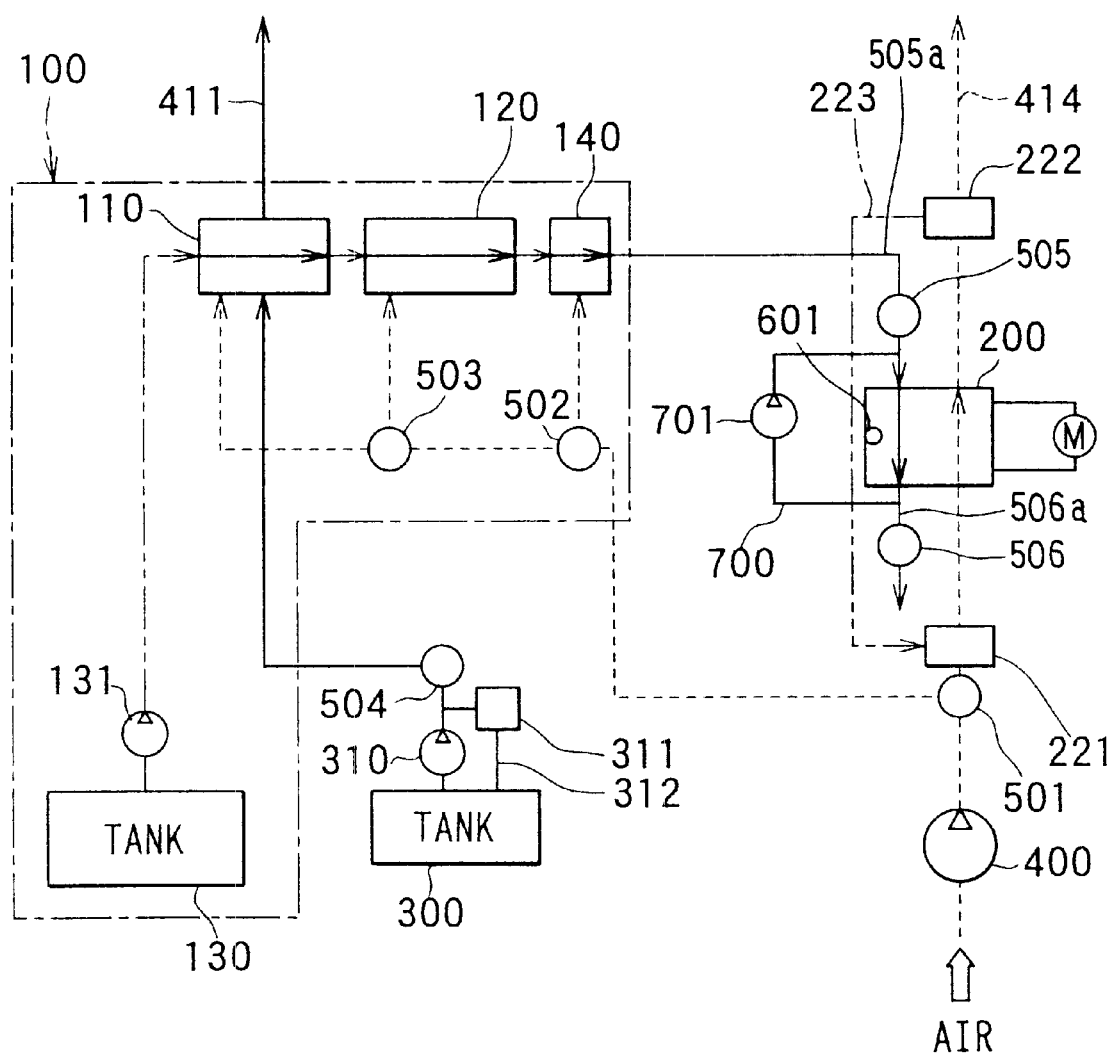
FIG. 11 is a schematic diagram showing a fuel cell system in a fifth preferred embodiment.
Figure 12:
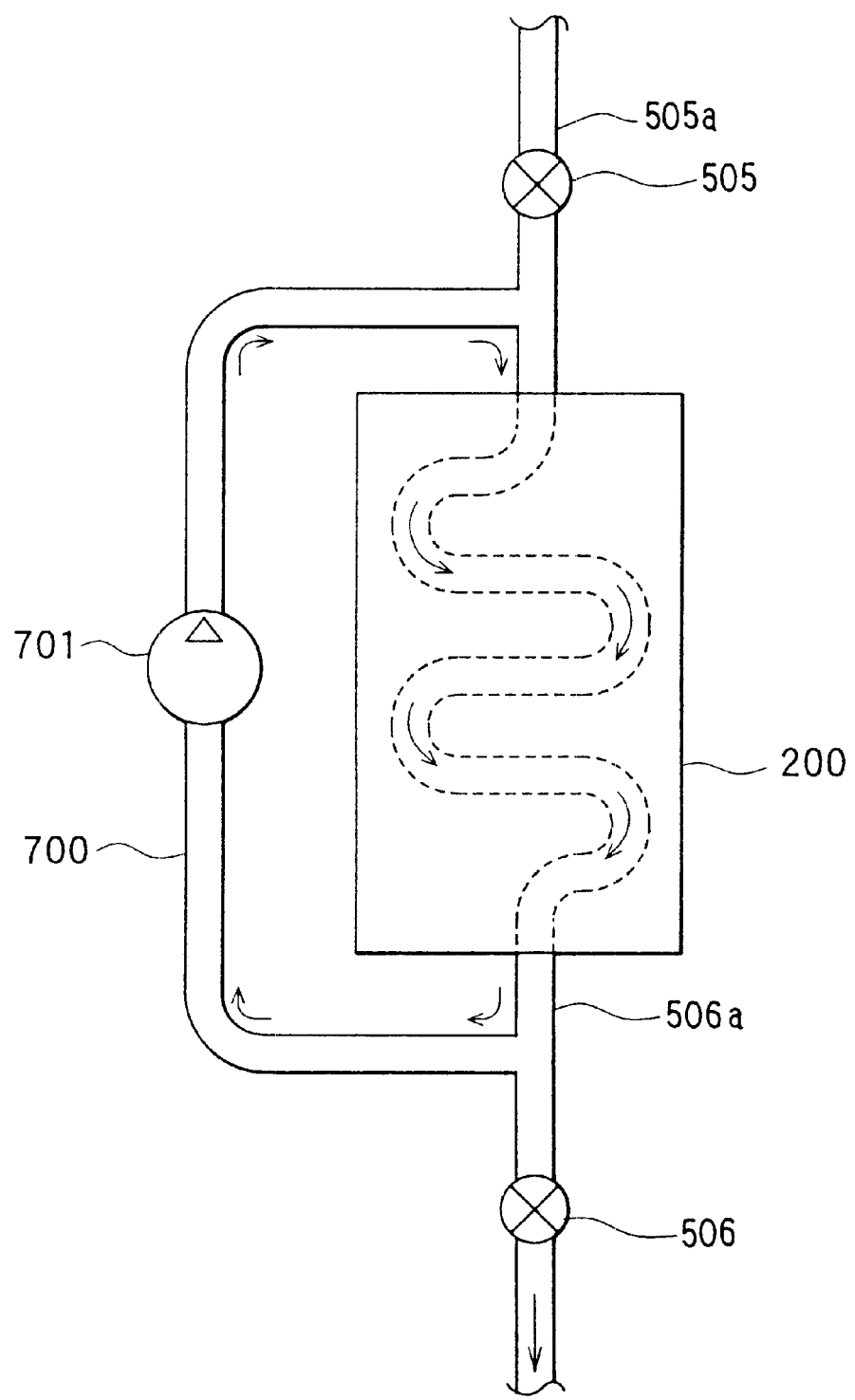
FIG. 12 is an enlarged schematic view showing an FC stack and the vicinity thereof in the fifth embodiment.

In this connection, in this embodiment, as shown in FIGS. 11 and 12, the upstream side of the inflow passage valve 505 in the hydrogen inflow passage 505*a* is connected to the downstream side of the discharge passage valve 506 in the hydrogen discharge passage 506*a* by the hydrogen circulation passage 700 while bypassing the FC stack 200. Further, a hydrogen circulation pump 701 is provided in the hydrogen circulation passage 700 to circulate hydrogen in the FC stack 200.

In this constitution, when the hydrogen circulation pump 701 is operated in a state where the two valves 505, 506 are closed, hydrogen containing gas circulates the FC stack 200→the hydrogen discharge passage 506*a*→the hydrogen circulation passage 700→the hydrogen inflow passage 505*a*→the FC stack 200 in this order. Accordingly, the hydrogen concentration can be made uniform in the FC stack 200, and the hydrogen amount permeating the polymeric film is prevented from being decreased in the FC stack 200. In consequence, the deterioration of the power generation capability of the FC stack 200 caused by the decrease in the hydrogen concentration can be suppressed.

In addition, hydrogen flows with a flow velocity due to the circulation thereof in the FC stack 200, and accordingly, hydrogen becomes liable to contact the polymeric film and the electrode (negative electrode). This facilitates the permeation of hydrogen in the polymeric film, and the decrease in the hydrogen amount permeating the polymeric film can be suppressed.

Figure 13:
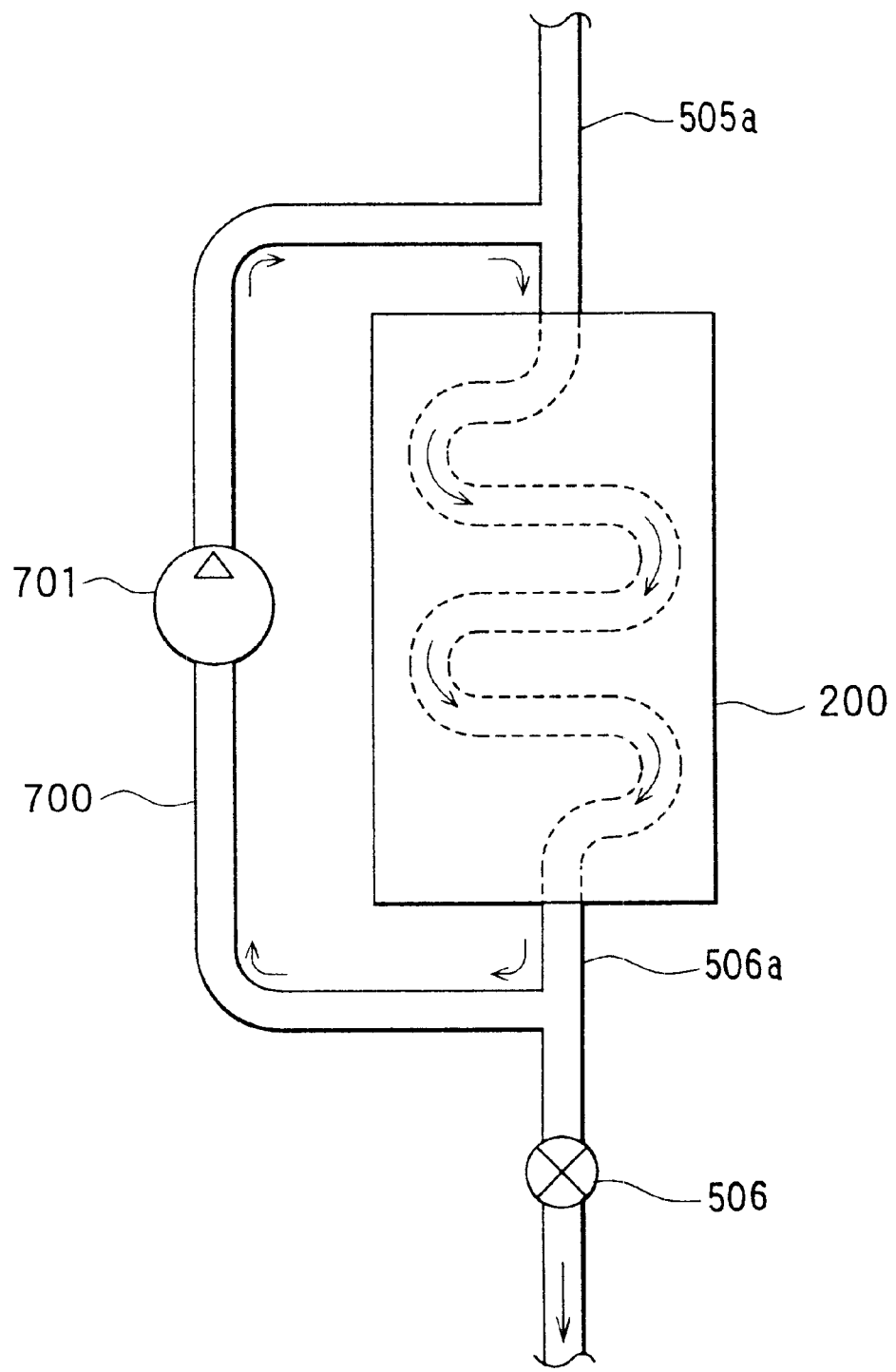
FIG. 13 is an enlarged schematic view showing the FC stack and the vicinity thereof as a modification of the fifth embodiment.

In the fuel cell system of the fifth embodiment, the two valves 505, 506 are provided at the upstream side and the downstream side of the FC stack 200; however, as shown in FIG. 13, only the discharge passage valve 506 may be provided at the downstream side of the FC stack 200 without the inflow passage valve 505 provided at the upstream side thereof. In this constitution, when hydrogen is circulated in the FC stack 200 in a sate where the valve 506 is closed, an average pressure in the FC stack 200 is constant, and hydrogen rich gas is not supplied from the hydrogen generator 100. Therefore, the same effects as those when the two valves are provided at the upstream side and the downstream side can be attained.

Also, in this embodiment, hydrogen is circulated at the order of the FC stack 200→the hydrogen discharge passage 506*a*→the hydrogen circulation passage 700→the hydrogen inflow passage 505*a*→the FC stack 200; however, it may be circulated in the reverse direction.

Also, in this embodiment, hydrogen is circulated in the FC stack 200 in a state where both the valves 505, 506 are closed; however, the valve state is not limited to that. Both the valves 505, 506 may be opened when hydrogen circulates. In this case, a flow velocity of hydrogen is generated, so that hydrogen becomes liable to contact the polymeric film and the electrode (negative electrode) in the FC stack 200. As a result, the permeation of hydrogen in the polymeric film can be promoted.

(Sixth Embodiment)

Figure 14:
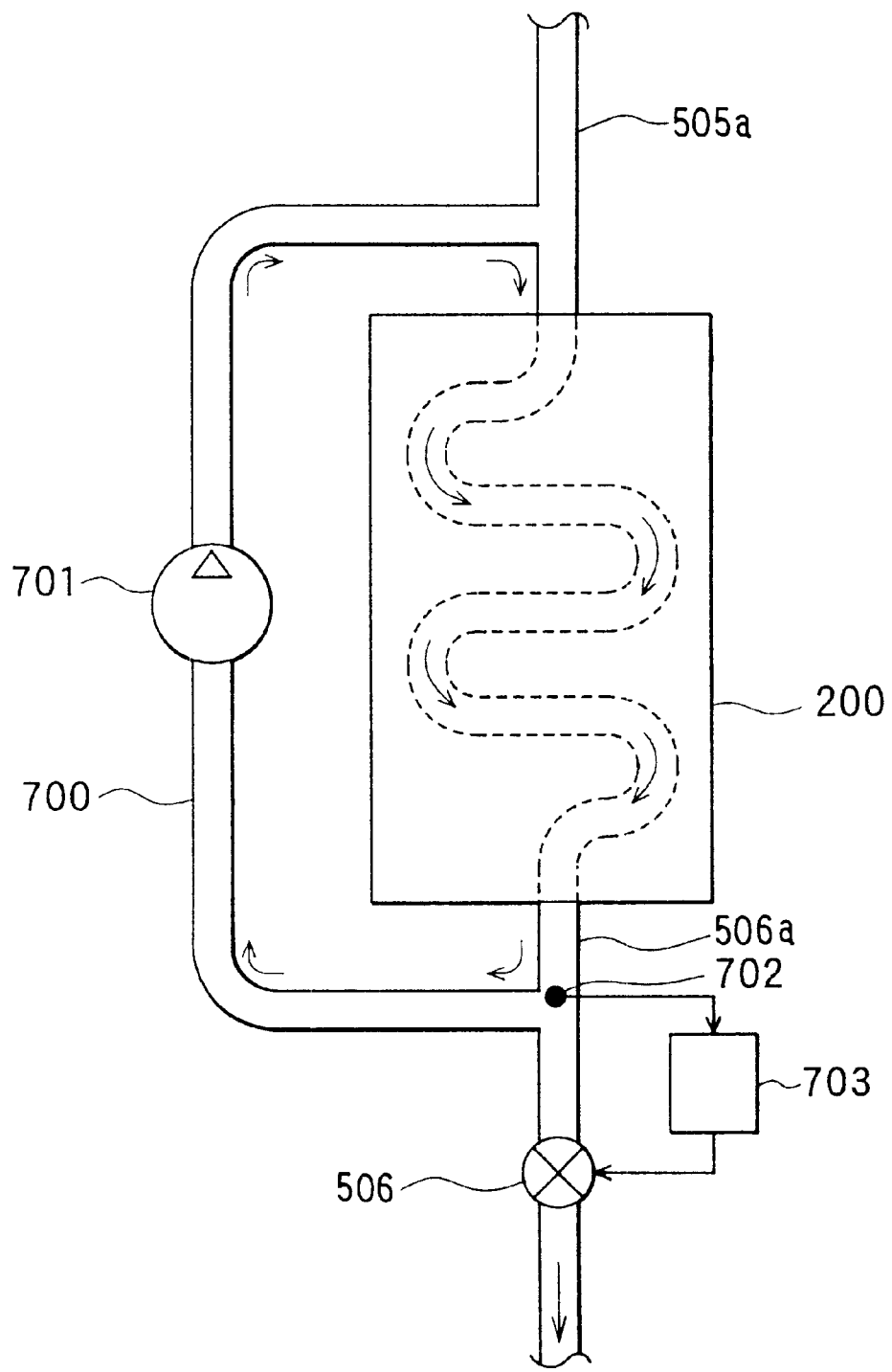
FIG. 14 is an enlarged schematic view showing an FC stack and the vicinity thereof in a sixth preferred embodiment.

A sixth preferred embodiment of the invention is explained with reference to FIG. 14 showing the vicinity of the fuel cell 200 in the fuel cell system. In the sixth embodiment, in comparison with the fuel cell system in the fifth embodiment, a part of hydrogen containing gas that circulates the FC stack 200 via the hydrogen circulation passage 700 is selectively discharged. The selectively discharged part has a lower hydrogen concentration. The inflow passage valve 505 is not provided in the hydrogen inflow passage 505*a* at the upstream side of the FC stack 200. The same parts as those in the fifth embodiment are designated with the same reference numerals.

Specifically, as shown in FIG. 14, a hydrogen sensor (hydrogen concentration detecting unit) 702 for detecting the hydrogen concentration of hydrogen containing gas circulating the FC stack 200 is provided at a branch point between the hydrogen discharge passage 506*a* and the hydrogen circulation passage 700. A control unit 703 is further provided to control the opening/closing of the discharge passage valve 506 based on the hydrogen concentration detected by the hydrogen sensor 702.

Next, the operations of the hydrogen sensor 702 and the control unit 703 in the fuel cell system of the sixth embodiment are explained below.

First, when hydrogen containing gas circulates the FC stack 200 via the hydrogen circulation passage 700, the hydrogen sensor 702 detects the hydrogen concentration of hydrogen containing gas passing through the branch point between the hydrogen discharge passage 506*a* and the hydrogen circulation passage 700. When the hydrogen concentration detected by the hydrogen sensor 702 is equal to or less than a third predetermined concentration d3, the control unit 703 opens the discharge passage valve 506. When the hydrogen concentration detected by the hydrogen sensor 702 is larger than the third predetermined concentration d3, the control unit 703 closes the discharge passage valve 506.

According to this constitution, in hydrogen containing gas circulating the FC stack 200, the part having the lower hydrogen concentration can be selectively discharged from the FC stack 200, and the hydrogen concentration of gas circulating the FC stack 2 can be made large. This suppresses the deterioration of the power generation capability of the FC stack 200 caused by the decrease in the hydrogen concentration.

(Seventh Embodiment)

Figure 15:
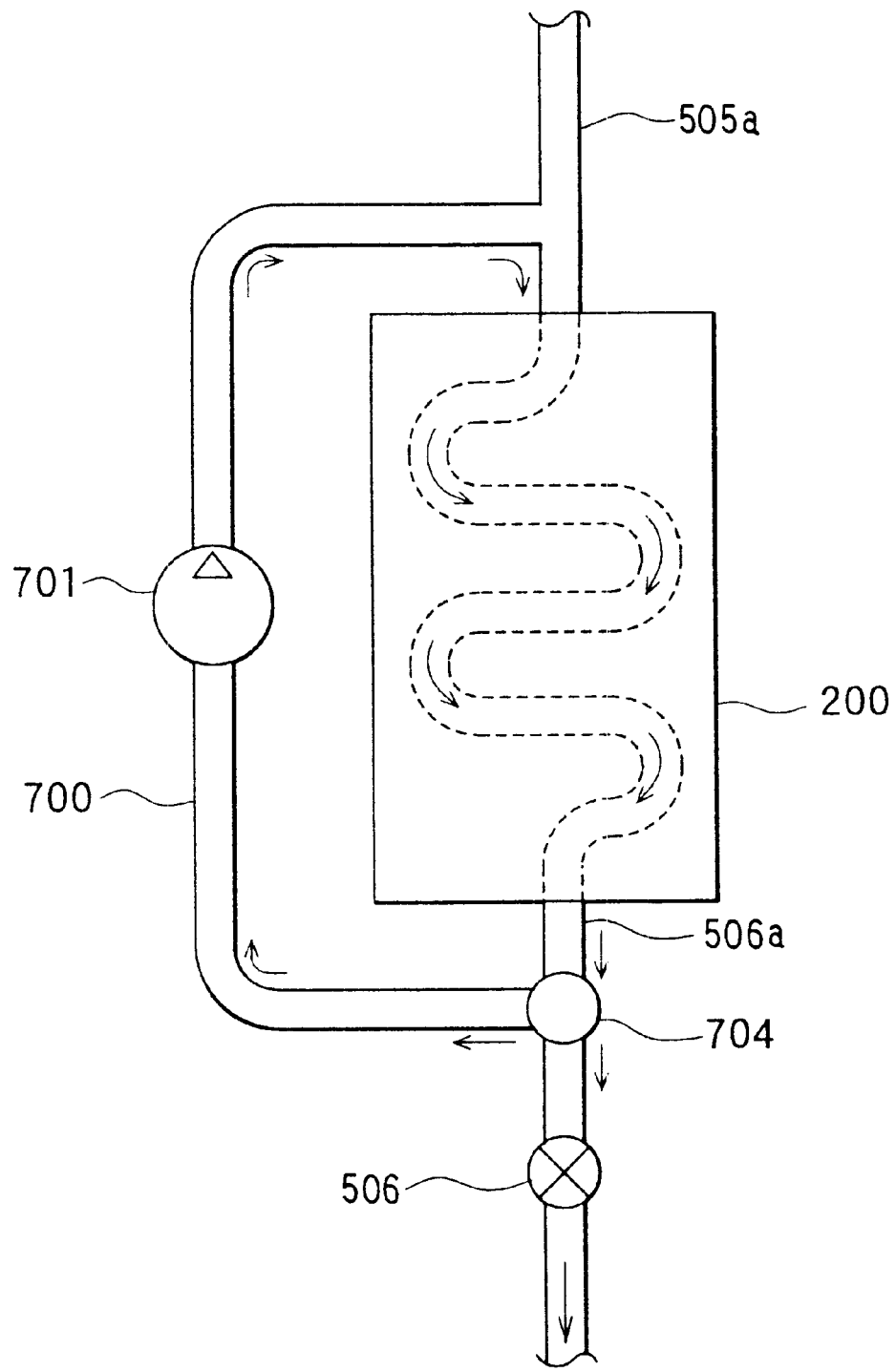
FIG. 15 is an enlarged schematic view showing an FC stack and the vicinity thereof in a seventh preferred embodiment.

Next, a seventh preferred embodiment of the invention is explained with reference to FIG. 15 showing the vicinity of the FC stack 200 in the fuel cell system. In this embodiment, in comparison with the fuel cell system in the fifth embodiment, a part of hydrogen containing gas circulating the FC stack 200 via the hydrogen circulation passage 700 is selectively discharged. The selectively discharged part has a lower hydrogen concentration. The inflow passage valve 505 is not provided in the hydrogen inflow passage 505*a* at the upstream side of the FC stack 200. The same parts as those in the fifth embodiment are designated with the same reference numerals.

Specifically, as shown in FIG. 15, in the seventh embodiment, a gas separation unit 704 is provided at the branch point between the hydrogen discharge passage 506*a* and the hydrogen circulation passage 700. The gas separation unit 704 selectively separates hydrogen from hydrogen containing gas circulating the FC stack 200, and is composed of a hydrogen separation film (selectively permeating film) made of, for example, polyimide film.

The gas separation unit 704 divides the hydrogen containing gas circulating the FC stack 200 into hydrogen (first gas) and other gases (second gas). Hydrogen is allowed to flow in the hydrogen circulation passage 700, and the other gases are discharged from the hydrogen discharge passage 506a. Accordingly, the hydrogen concentration of hydrogen containing gas circulating the FC stack 200 can be made large, and the deterioration of the power generation capability of the FC stack 200 caused by the decrease of the hydrogen concentration can be suppressed.

In this embodiment, the gas separation unit 704 is provided to selectively separate hydrogen from the hydrogen containing gas circulating the FC stack 200; however, it is not limited to that. A gas separation unit capable of selectively separating water vapor may be provided to increase a concentration of water vapor in the hydrogen containing gas circulating the FC stack 200. The increase in the concentration of water vapor in the hydrogen containing gas facilitates humidification of the polymeric film in the FC stack 200.

The fuel cell system may be equipped with one gas separation unit having two functions for separating hydrogen and for separating water vapor, or be equipped with two gas separation units respectively having the functions for separating hydrogen and for separating water vapor, when hydrogen and water vapor should be separated.

(Eighth Embodiment)

Next, an eighth preferred embodiment of the invention is explained with reference to FIGS. 16 and 17. Like the fuel cell system of the seventh embodiment, an object of the eighth embodiment is to prevent deterioration of power generation capability of the FC stock by suppressing the decrease in hydrogen amount passing through the polymeric film in the FC stack 200 ascribed to the decrease in the hydrogen concentration.

In the eighth embodiment, in comparison with the fuel cell system of the fifth embodiment, a reciprocating flow generation unit 800 for generating a flow of hydrogen that reciprocates in the FC stack 200 is provided in place of the hydrogen circulation passage 700 for circulating hydrogen in the FC stack 200. The same parts as those in the fifth embodiment are indicated with the same reference numerals.

Figure 16:
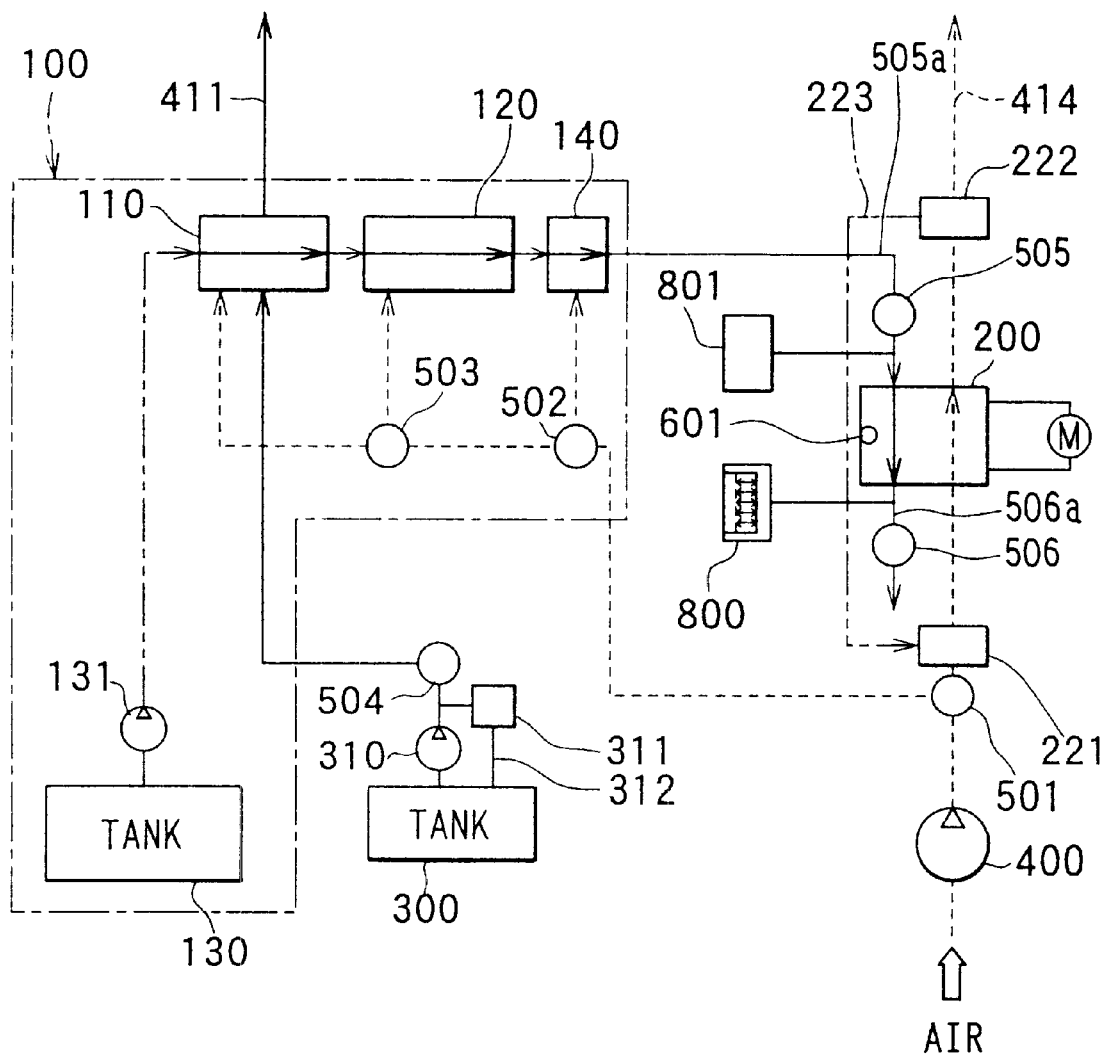
FIG. 16 is a schematic diagram showing a fuel cell system in an eighth preferred embodiment.
Figure 17:
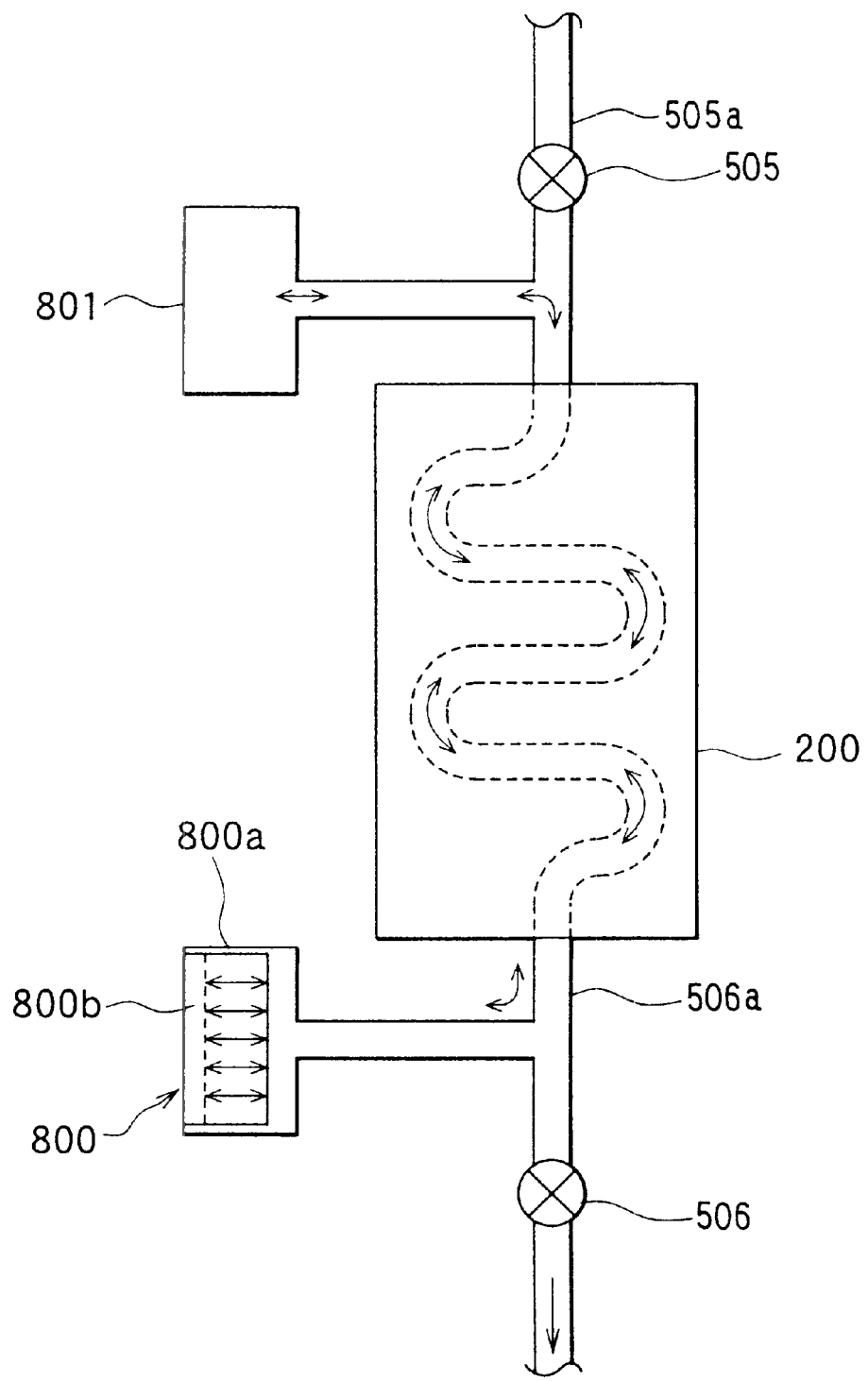
FIG. 17 is an enlarged schematic diagram showing an FC stack and the vicinity thereof in the eighth embodiment.

As shown in FIGS. 16 and 17, the fuel cell system of the present embodiment has the reciprocating flow generation unit 800 communicating with the hydrogen discharge passage 506a at the upstream side of the discharge passage valve 506. The reciprocating flow generation unit 800 is composed of a content volume changeable chamber 800a having a changeable content volume and a drive part 800b for controlling the content volume of the content volume changeable chamber 800a. The reciprocating flow generation unit 800 generates a flow of hydrogen that reciprocates in the FC stack 20 by varying the content volume of the content volume changeable chamber 800a. In the eighth embodiment, a piezo vibrator (piezoelectric material), a volume of which is changed by applied voltage, is used as the drive part 800b.

At the opposite side of the FC stack 200 with respect to the reciprocating flow generation unit 800, i.e., at the downstream side of the inflow passage valve 505 in the hydrogen inflow passage 505a, a pressure buffer chamber 801 is provided to buffer the variation in hydrogen pressure in the FC stack 200.

In the fuel cell system as described above, the reciprocating flow generation unit 800 is operated in a state where the two valves 505, 506 are closed. Accordingly, a flow of hydrogen is produced in the FC stack 200 to reciprocate in a passage in the FC stack 200.

At that time, because both the valves 505, 506 are closed at the upstream side and the downstream side of the FC stack 200, the pressure of hydrogen in the FC stack 200 is changed by changing the content volume of the content volume changeable chamber 800a. Here, when the content volume of the content volume changeable chamber 800a is increased, hydrogen is compressed because there is no space to which hydrogen is released. As a result, the flow of hydrogen that reciprocates in the FC stack 200 may not be produced effectively in the FC stack 200.

In this connection, in the eighth embodiment, the pressure buffer chamber 801 is provided at the opposite side of the FC stack 200 with respect to the reciprocating flow generation unit 800. Therefore, the variation in hydrogen pressure in the FC stack 200 can be absorbed, so that the reciprocating flow of hydrogen can be securely produced in the FC stack 200.

Thus, according to the fuel cell system of the eighth embodiment, the hydrogen concentration can be made uniform in the FC stack 200 by producing the reciprocating flow of hydrogen therein, and the amount of hydrogen permeating the polymeric film can be suppressed from being decreased due to the decrease of the hydrogen concentration, as well as in the fifth embodiment. In consequence, the power generation capability of the FC stack 200 can be prevented from being lessened due to the decrease of the hydrogen concentration in the FC stack 200.

In addition, because hydrogen reciprocates in the FC stack 200 with a flow velocity, it is easier for hydrogen to contact the polymeric film and the electrode (negative electrode) in the FC stack 200. Therefore, hydrogen permeation of the polymeric film is facilitated, and the decrease of hydrogen amount permeating the polymeric film is suppressed.

In the eighth embodiment, the reciprocating flow generation unit 800 is provided at the downstream side of the FC stack 200, and the pressure buffer chamber 801 is provided at the upstream side of the FC stack 200. However, the arrangement is not limited to that. The reciprocating flow generation unit 800 may be positioned at the upstream side of the FC stack 200, and the pressure buffer chamber 801 may be positioned at the downstream side of the FC stack 200.

The drive part 800b of the reciprocating flow generation unit 800 is composed of a piezoelectric material in this embodiment; however, it is not limited to that. For example, a piston may be provided as the drive part 800b, which performs a reciprocating motion in the content volume changeable chamber 800a. Otherwise, a bellows may be used as the content volume changeable chamber 800a, which has a content volume that is changed by an external pressure or an external force produced by the drive part 800b such as a cam. Incidentally, when the piezoelectric material is used as the drive part 800b as in the eighth embodiment, leakage of hydrogen and material deterioration are less liable to occur as compared to other cases.

Figure 18:
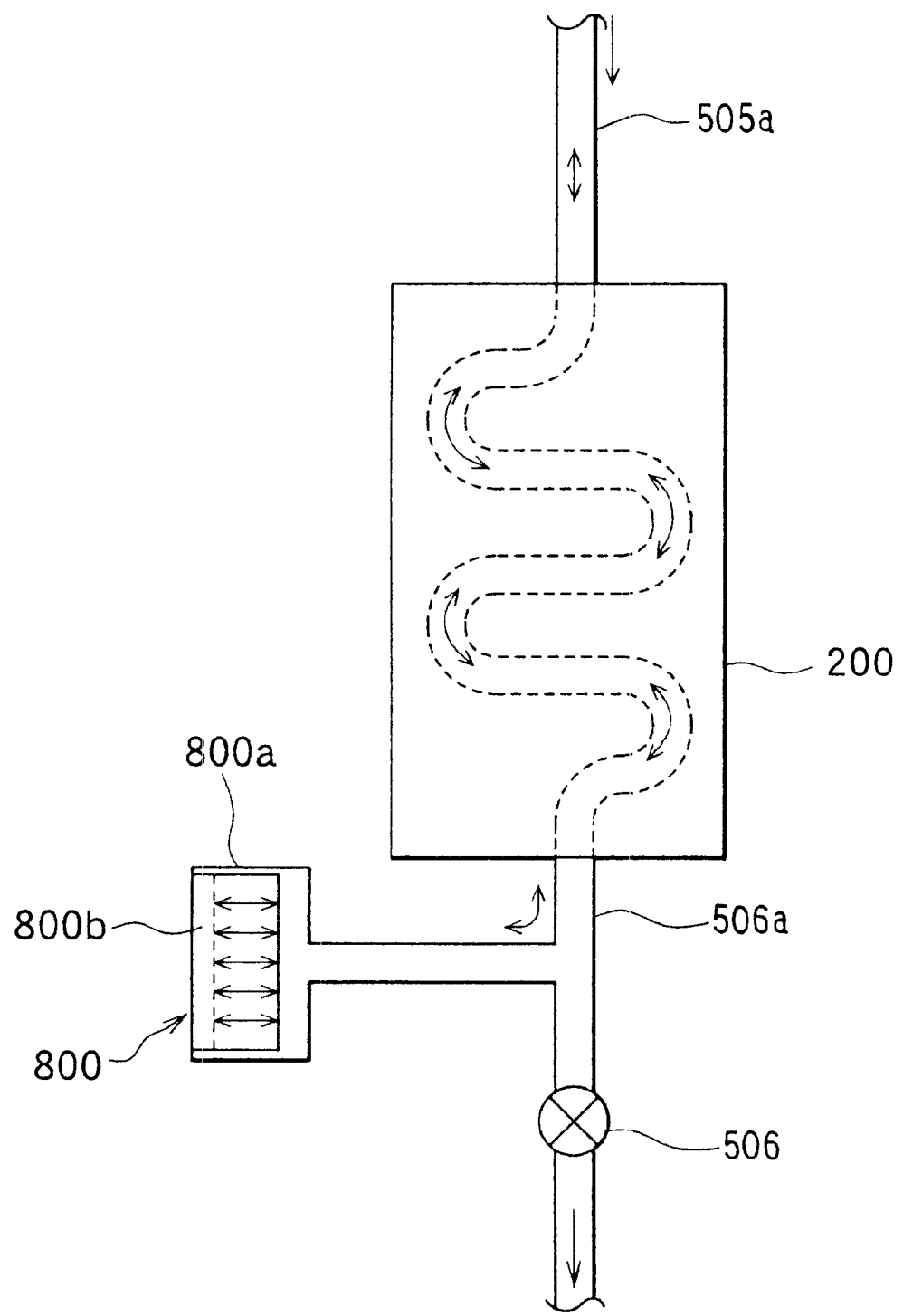
FIG. 18 is an enlarged schematic diagram showing the FC stack and the vicinity thereof as a modification of the eighth embodiment.

Also, the eighth embodiment adopts the two valves 505, 506 provided at the upstream side and the downstream side of the FC stack 200. However, as shown in FIG. 18, only the discharge passage valve 506 may be provided at the downstream side of the FC stack 200 without adopting the inflow passage valve 505 at the upstream side thereof. In this case, likewise, the reciprocating flow generation unit 800 can be positioned at either of the upstream side and the downstream side of the FC stack 200.

When the reciprocating flow generation unit 800 is disposed at the downstream side of the FC stack 200, because hydrogen pressure can be released to the upstream side of the FC stack 200, the pressure buffer chamber 800a needs not be provided. When the reciprocating flow generation unit 800 is disposed at the upstream side of the FC stack 200, the pressure buffer chamber 801 should be provided in the hydrogen discharge passage 506a at the downstream side of the FC stack 200.

In the above-described embodiments, although the hydrogen concentration is detected at one location in the FC stack 200 by the hydrogen sensor 601, several hydrogen sensors may be provided in the FC stack 200 to detect hydrogen concentrations at several locations therein. In this case, the control for opening and closing the valve(s) 506 (505, 506) is performed based on the hydrogen concentrations detected at the several locations. If there arises variation in hydrogen concentration in the FC stack 200, the control of the valve(s) 506 (505, 506) can be performed accurately.

In the sixth embodiment described above, the hydrogen sensor 702 is used as a hydrogen concentration detecting unit, which detects directly the hydrogen concentration of hydrogen containing gas flowing in the branch point between the hydrogen discharge passage 506a and the hydrogen circulation passage 700. However, the hydrogen concentration may be detected indirectly based on a physical quantity related to the hydrogen concentration in the branch point.

For example, as explained in the second and third embodiments, other detecting units such as a current detector for detecting the electric energy generated in the FC stack 200, a timer previously set at a specific time period in relation to the hydrogen consumed amount in the FC stack 200, and a pressure sensor for detecting a gas pressure in the FC stack (negative side) 200 may be used to detect indirectly the hydrogen concentration in hydrogen containing gas flowing in the branch point between the hydrogen discharge passage 506a and the hydrogen communication passage 700.

Also, it is not always necessary that the hydrogen concentration be detected at the branch point between the hydrogen discharge passage 506a and the hydrogen communication passage 700. The hydrogen concentration may be detected at a point apart from the branch point by a hydrogen sensor, a pressure sensor, or the like. In this case, in consideration of the flow velocity of hydrogen containing gas circulating the FC stack 200, the control unit 703 controls the opening/closing of the discharge passage valve 506. For example, when it is assumed that it takes one second that hydrogen containing gas flows from the point where the hydrogen concentration is detected and to the branch point between the hydrogen discharge passage 506a and the hydrogen communication passage 700, the discharge passage valve 506 is opened after one second is elapsed from the time when the detected hydrogen concentration becomes equal to or less than the third predetermined concentration d3.

In the above-described embodiments, the present invention is applied to an electric vehicle; however, it is not limited to that, but may be applied to a domestic non-transplanting fuel cell system and the like.

Although the hydrogen generator 100 is used as a hydrogen supply unit to generate hydrogen rich gas containing a large amount of hydrogen by reforming fuel containing hydrocarbon, the present invention is not limited to that. Alternatively, a high-pressure hydrogen tank, a hydrogen tank using hydrogen absorption alloy, or the like may be used as the hydrogen supply unit. In this case, because impurities are not contained in hydrogen that is to be supplied to the FC stack 200, carbon dioxide and the like do not remain in the FC stack 200. Therefore, when the two valves 5005, 506 are provided as in the first embodiment, the first hydrogen valve 505 can be closed after the second hydrogen valve 506 is closed.

Incidentally, in the fuel cell system for the electric vehicle, pressurized hydrogen is supplied to the FC stack 200; however, in a domestic non-transplanting type fuel cell system, there is a case where hydrogen is supplied to the FC stack without being pressurized. In this case, it is desirable that the second hydrogen valve 506 is opened after the first hydrogen valve 505 is opened.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A fuel cell system comprising:

a fuel cell for generating electric energy by a chemical reaction between hydrogen and oxygen;

a hydrogen supply unit connected to the fuel cell to supply hydrogen to the fuel cell;

a discharge passage valve provided in a hydrogen discharge passage through which a hydrogen containing gas is discharged as an exhaust gas from the fuel cell, the discharge passage valve being for opening and closing the hydrogen discharge passage based on the amount of hydrogen consumed in the fuel cell; and a reciprocating flow generation unit connected to an upstream side of the discharge passage valve in the hydrogen discharge passage to generate a flow of the hydrogen containing gas reciprocating in the fuel cell; wherein the hydrogen is supplied to the fuel cell intermittently in accordance with an amount of hydrogen consumed in the fuel cell.

2. The fuel cell system according to claim 1, wherein the reciprocating flow generation unit produces the flow of the hydrogen containing gas reciprocating in the fuel cell when the discharge passage valve is closed.

3. The fuel cell system according to claim 1, wherein the reciprocating flow generation unit has a content volume changeable chamber having a changeable content volume, and a drive part for changing the content volume of the content volume changeable chamber.

4. The fuel cell system according to claim 3, wherein the drive part is composed of a piezoelectric material having a volume that is changed by an applied voltage.

5. A fuel cell system comprising:

a fuel cell for generating electric energy by a chemical reaction between hydrogen and oxygen;

a hydrogen supply unit connected to the fuel cell to supply hydrogen to the fuel cell;

a discharge passage valve provided in a hydrogen discharge passage through which a hydrogen containing gas is discharged as an exhuast gas from the fuel cell, the discharge passage valve being for opening and closing the hydrogen discharge passage based on the amount of hydrogen consumed in the fuel cell;

a reciprocating flow generation unit connected to one of a hydrogen inflow passage through which the hydrogen is supplied to the fuel cell, and the hydrogen discharge passage, for generating a flow of the hydrogen containing gas reciprocating in the fuel cell; and a pressure buffer chamber connected to another one of the hydrogen inflow passage and the discharge passage for buffering variation in hydrogen pressure in the fuel cell; wherein the hydrogen is supplied to the fuel cell intermittently in accordance with an amount of hydrogen consumed in the fuel cell.

6. The fuel cell system according to claim 5, further comprising an inflow passage valve provided in the hydrogen inflow passage for opening and closing the hydrogen inflow passage wherein:

the reciprocating flow generation unit is connected to the one of the hydrogen inflow passage at a downstream side of the inflow passage valve and the hydrogen discharge passage at an upstream side of the discharge passage valve.

7. The fuel cell system according to claim 5, wherein the reciprocating flow generation unit produces the flow of the hydrogen containing gas reciprocating in the fuel cell when the discharge passage valve and the inflow passage valve are closed.

* * * * *